United States Patent [19]

Cicci

[11] 4,175,366
[45] Nov. 27, 1979

[54] HARVESTER LIFT AND FLOAT MECHANISM

[75] Inventor: George B. Cicci, Burr Ridge, Ill.

[73] Assignee: International Harvester Company, Chicago, Ill.

[21] Appl. No.: 914,320

[22] Filed: Jun. 12, 1978

[51] Int. Cl.² .................................................. A01D 47/00
[52] U.S. Cl. ..................................... 56/15.8; 56/DIG. 1
[58] Field of Search .................. 56/15.8, 208, DIG. 1, 56/DIG. 9, DIG. 10, 14.9

[56] References Cited

U.S. PATENT DOCUMENTS

| | | |
|---|---|---|
| 3,479,805 | 11/1969 | Soteropulos ..................... 56/DIG. 1 |
| 3,599,411 | 8/1971 | Scarnato et al. ....................... 56/208 |
| 3,699,754 | 10/1972 | Koch et al. ............................. 56/15.8 |
| 3,958,399 | 5/1976 | Schoeneberger et al. ............. 56/15.8 |
| 3,959,957 | 6/1976 | Halls ...................................... 56/208 |
| 4,081,946 | 4/1978 | Ehrhart ................................. 56/15.8 |

FOREIGN PATENT DOCUMENTS 189830  6/1956  Austria ........................................ 56/208

Primary Examiner—Louis G. Mancene
Assistant Examiner—Paul J. Hirsch
Attorney, Agent, or Firm—Dennis K. Sullivan; Neal C. Johnson; F. David AuBuchon

[57] ABSTRACT

A hay harvesting machine of the type having a mobile carrying frame and a header mounted thereto by a pivotal linkage including an upper link and a pair of lower swing links is provided with header flotation means pivotally connected to the lower swing links at points below a line interconnecting the pivotal mountings of said links to said header and said frame and below the latter pivotal connection in the operating position. The lifting cylinders are disposed wholly within the carrying frame.

5 Claims, 7 Drawing Figures

U.S. Patent  Nov. 27, 1979  Sheet 1 of 4  4,175,366
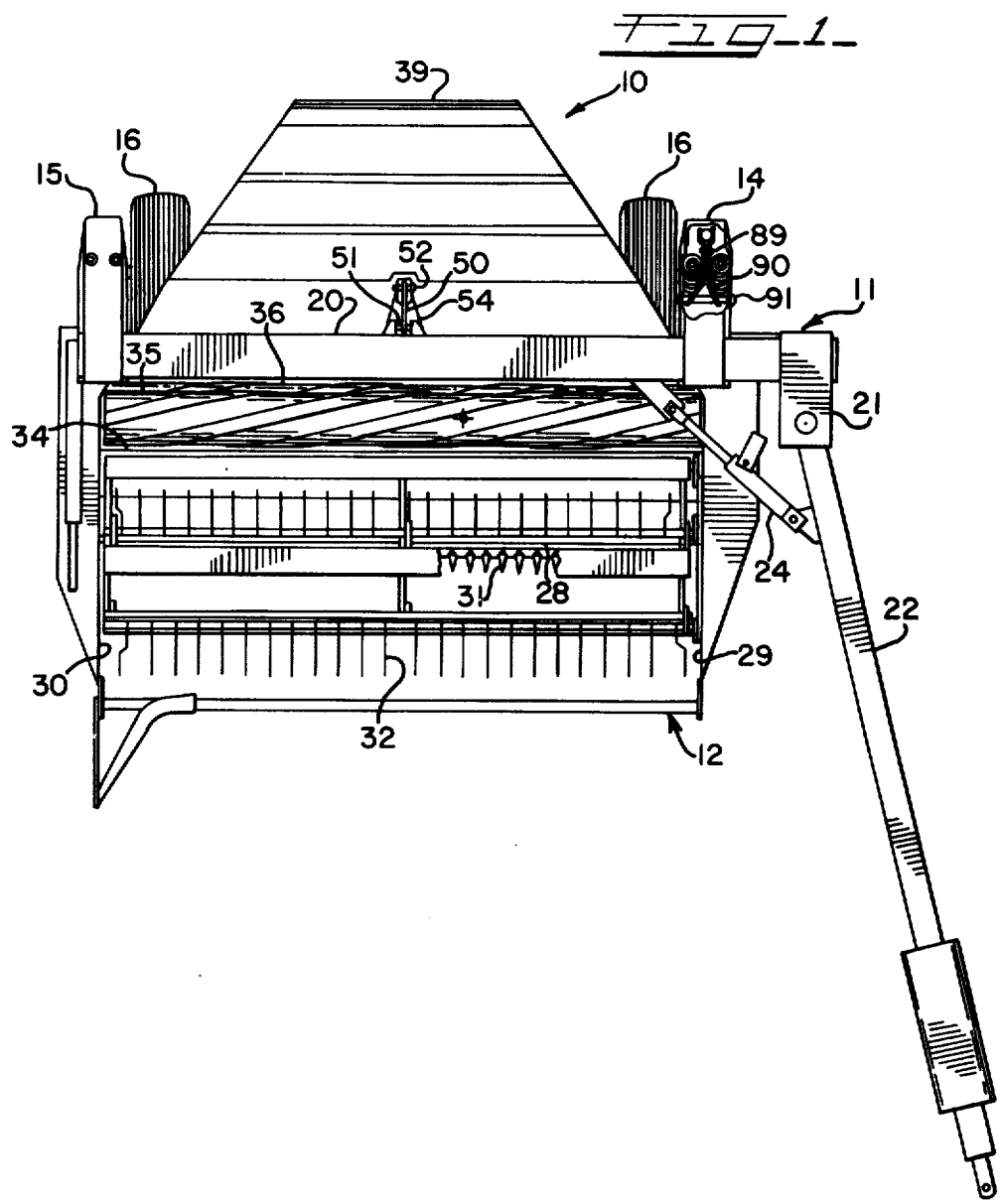
FIG_1_

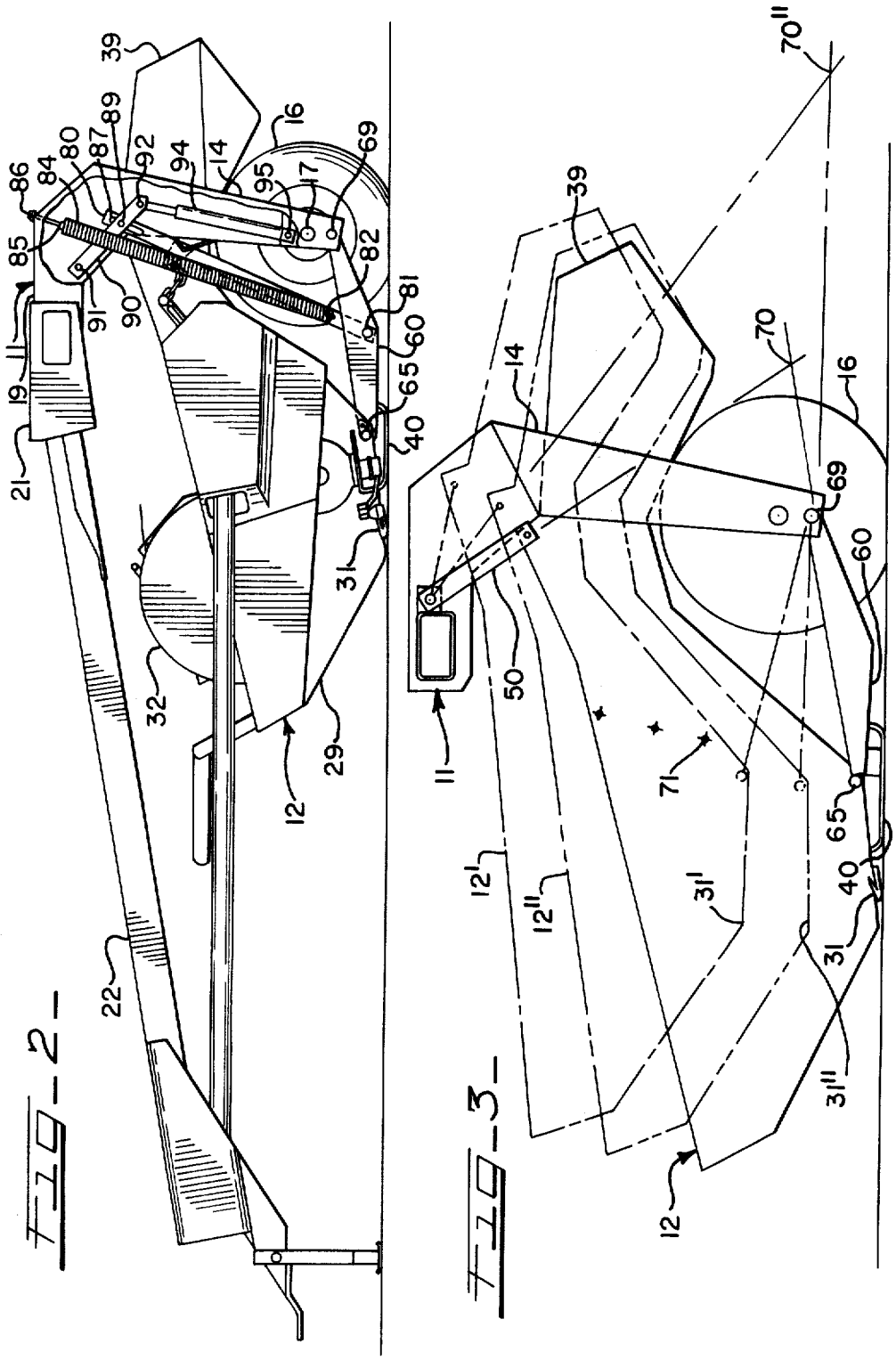

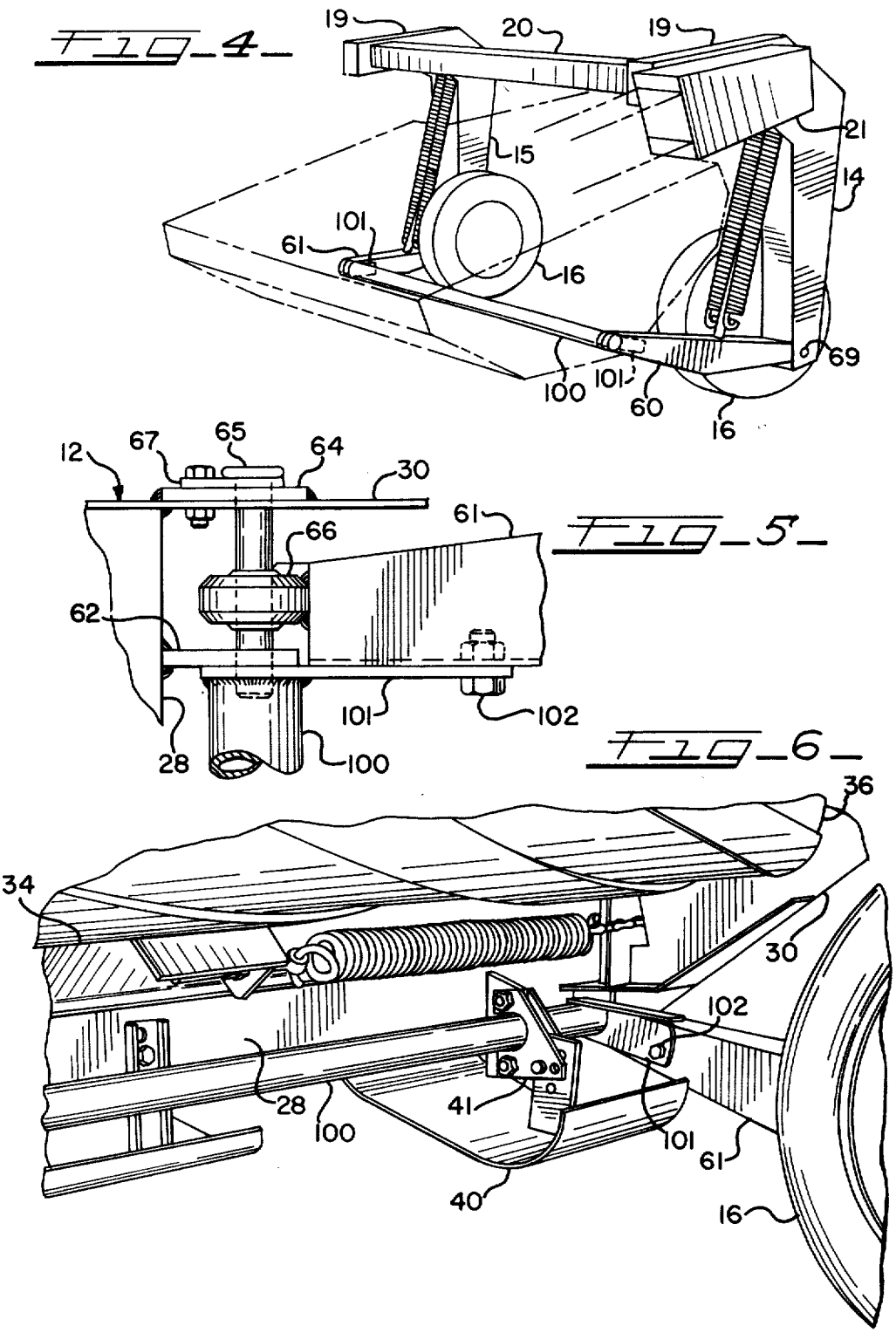

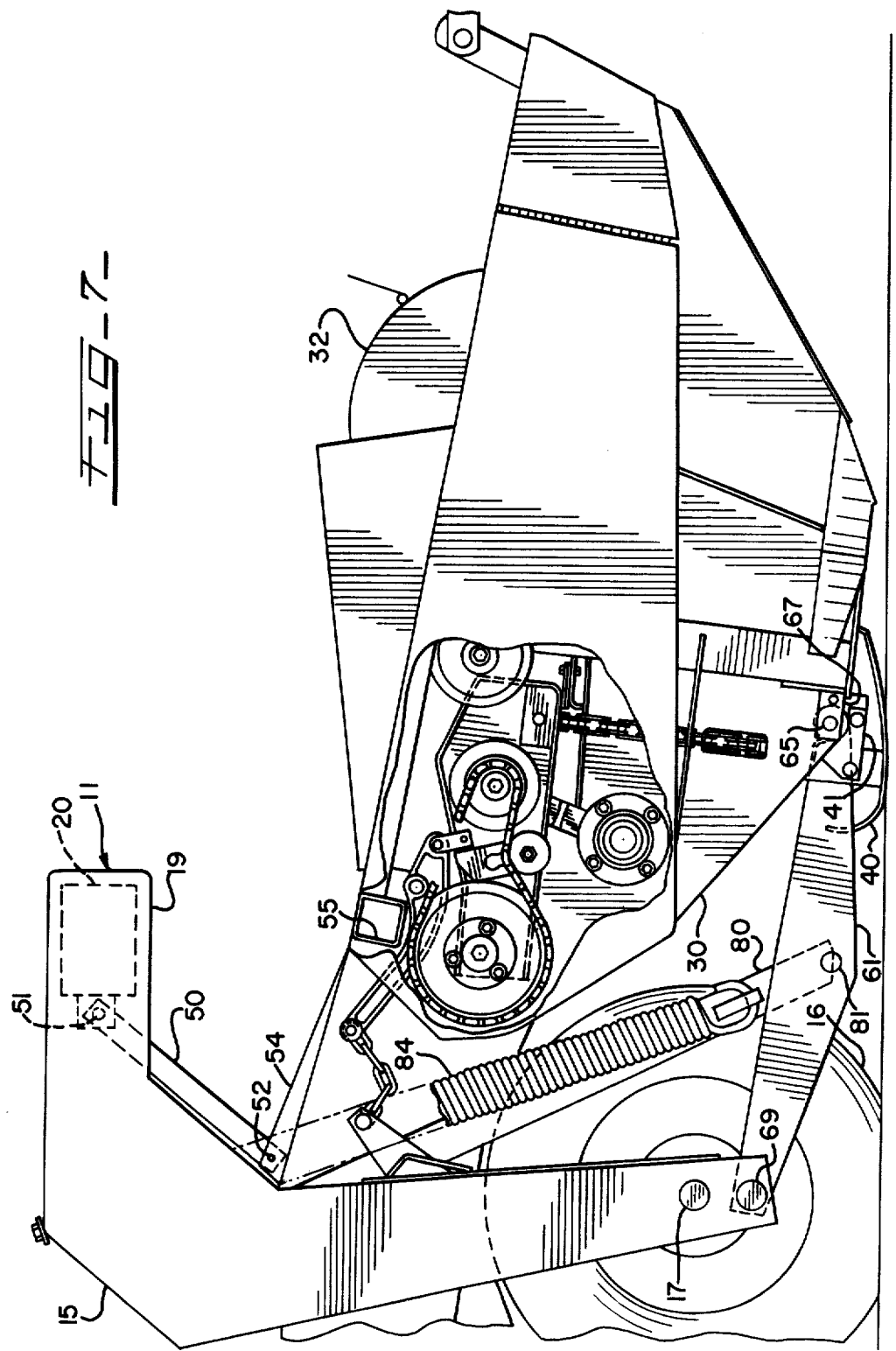

HARVESTER LIFT AND FLOAT MECHANISM

BACKGROUND OF THE INVENTION AND THE PRIOR ART

This invention relates to mobile crop harvesters for harvesting hay or forage, such as a mower conditioner or windrower of the type having a laterally elongated crop harvesting header mounted by a linkage to a carrying frame and, more particulary, to a lift and float mechanism for controlling the linkage to move the header between a lowered operating position and a raised transport position.

It is previously known to provide floatation spring and lift linkages acting upon the lower swing links interconnecting a crop harvesting header to a windrower carrying frame. See, for example, Schoeneberger U.S. Pat. No. 3,958,399, which teaches a lift and float mechanism similar to that described herein.

It has been found however, that certain improvements can be made in the lift and float mechanism which will improve the operation, appearance, and durability of a mower conditioner. For example, one problem encountered is that when the header floats upwardly relative to the carrier frame, the floatation springs become weaker and therefore some of the counterbalancing force is lost.

Accordingly, it is an object of the invention described and claimed herein to dispose the pivotal connection of the floatation springs to the lower spring link substantially below the pivot of the swing link with the frame.

A further object of the invention is to dispose the header lift cylinders wholly within the carrying frame of the harvester which not only protects the cylinders from injury from external sources but also improves the appearance of the machine.

The above objects are met in a mobile crop harvester comprising a wheel supported main frame including a pair of hollow generally vertical laterally disposed frame members and a horizontal beam extending laterally between said vertical frame members, an elongated crop harvesting header mounted to said frame by a pivotal linkage including an upper link and a pair of laterally disposed lower swing links for movements of the header between a lowered operating position and a raised transport position, said header further comprising a cutting apparatus disposed across the forward edge thereof and ground shoes for engaging the height of the cutting apparatus in the operating position. The lifting apparatus comprises a lifting strap pivotally attached to each of the lower links intermediate the ends thereof at a point below a line interconnecting the pivotal mountings of the lower link and below the pivotal mounting thereof to the frame in the operating position. The lifting strap extends upwardly to a lift lever arm pivotally mounted wholly within the vertical frame member and having a lost motion connection with the lifting strap and a hydraulic cylinder, pivotally mounted wholly within the vertical frame member, is pivotally attached to the lifting arm so that upon extension, the hydraulic cylinder takes up the lost motion connection and lifts the lower link through the lifting strap. Floatation springs are attached to the lower portion of the lifting strap in laterally adjacent relationship and extend upwardly to adjustable connections with the frame member.

DESCRIPTION OF THE DRAWINGS

Other objects and advantages of the invention will become apparent upon reading the detailed description of the invention and upon reference to the drawings, in which:

FIG. 1 is a plan view of a mower-conditioner incorporating the invention described and clamed herein;

FIG. 2 is a left side view of the mower-conditioner of FIG. 1;

FIG. 3 is a schematic left side view of the motion of the header of the mower-conditioner of FIG. 1 relative to the carrying frame;

FIG. 4 is a schematic illustration of the carrying frame and lower suspension linkage of the mower conditioner of FIG. 1, the header being illustrated in phantom lines;

FIG. 5 is a detailed plan view partly in section of the intersection of the torque transmitting bar of FIG. 4 with the right lower suspension link;

FIG. 6 is a pictorial view of the lower right rear portion of the mower conditioner of FIG. 1, and FIG. 7 is a right side view of the mower conditioner of FIG. 1 with a portion of the side cover removed to illustrate the conditioning roll mounting.

DETAILED DESCRIPTION OF THE PREFERRED EMBODIMENT

As used in the following description, the terms "left", "right", "forward", and "rearward", are to be taken as being viewed by a person standing at the rear of the harvester looking forward and should not be construed to be limit the invention except as specifically noted.

Turning to the drawings, there is shown a mower-conditioner designated 10 which generally comprises a mobile carrying frame assembly 11 and a laterally elongated crop harvesting header assembly 12 mounted thereto by a linkage permitting the header 12 to move generally vertically relative to the frame assembly 11. The mobile carrying frame assembly 11 comprises left and right vertical frame members 14 and 15 having ground wheels 16 rotatably mounted on spindles 17 welded on the respective inner sides thereof adjacent the bottom. The vertical frame members 14 and 15 are of inverted L-shape and extend upwardly slightly to the rear to a forwardly extending upper leg portion 19 and are hollow to receive a portion of the lifting and floatation mechanism. As best seen in FIGS. 1 and 4, a horizontal main beam 20 is welded to and extends laterally between the forwardly extending upper leg portions 19 of the vertical frame members 14 and 15, thus forming an integral carrying frame structure. The horizontal main beam 20 extends leftward of the left vertical member 14 to a forwardly extending socket-like member 21 welded thereto to which the rear end of a tractor hitch tongue 22 is pivotally attached for lateral swinging. The tongue position is controlled by a hitch lock mechanism 24 of selectively variable length interconnecting the horizontal main beam 20 and the tongue 22 to control the relative position of the mower conditioner 10 behind a pulling tractor (not shown) which additionally provides mechanical and hydraulic power for operating the various mechanisms of the mower conditioner 10 in any known manner.

The crop harvesting header 12 is a conventional header used in hay harvesting machines, for example of the general type illustrated in Bornzin et al. U.S. Pat. No. 3,625,537, comprising a laterally elongated cutterbar 28 which forms a main lateral frame member interconnecting the side sheets 29 and 30 of the header 12 and has a sickle bar type cutting apparatus 31 disposed laterally across the forward edge thereof. A conventional rotary reel 32 is rotatably mounted between side sheets 29 and 30 above the cutting apparatus 31 for removing crops therefrom and sweeping them rearwardly and upwardly along a platform sheet 34 attached to the rear of the cutterbar 28 and curved upwardly to follow the reel periphery. The crops are delivered into the nip of a pair of conventional laterally elongated upper and lower crop conditioning rolls 35 and 36 rotatably mounted between the side sheets 29 and 30 of the header 12. The crops are ejected from the conditioning rolls 35 and 36 in a rearward and upwardly directed stream into a windrow forming hood 39 wherein the crops are laterally consolidated and deposited on the ground in a windrow. The header 12 is further provided with means for regulating the minimum height of the cutting appartus 31 from the ground in the form of a pair of ground engaging gage shoes 40 disposed respectively adjacent the left and right ends of the cutterbar 28, being mounted thereto in conventional fashion by having their forward portions hooked into the bottom side of the cutterbar 28 just rearwardly of the cutting apparatus and having their rearward portions adjustably secured to brackets 41 mounted on the rear of the cutterbar, as shown in FIG. 6.

The header 12 is mounted in underslung fashion beneath the horizontal main beam 20 of the carrying frame 11 by means of a linkage permitting a range of generally vertical movements of the header relative to the frame, such as shown in FIG. 3 and which will be specifically described hereinafter. As shown in FIGS. 1 and 7, the linkage comprises an upper link 50 pivotally attached to a pin 51 mounted by brackets to the rearward side of the horizontal main beam 20 centrally between the vertical frame members 14 and 15. The upper link 50 extends downwardly rearwardly to a pivotal mounting with a pin 52 mounted on a bracket 54 attached to the upper side of the header 12 at the lateral center of the window hood 39 immediately behind an upper transverse beam 55 which also interconnects the side sheets 29 and 30. The lower rearward portion of the header 12 is linked to the lower portion of the vertical legs 14 and 15 respectively of the carrying frame 11 by left and right lower swing links 60 and 61. FIG. 5 illustrates the mounting of the right lower swing link 61 to the header 12. The mounting of the left lower swing link 60 to the header 12 is a mirror image of this mounting. A bracket 62 is welded to and extends rearwardly from the rear of the cutterbar 28 parallel to the right side wall 30, the latter being thickened by the addition of a welded plate 64 to provide additional strength. A pin 65 is inserted through slightly larger apertures in the side wall 30, a bearing 66 attached to the forward end of the right lower link 61 and the bracket 62. A locking plate 67 is welded to the pin 65 adjacent its head and extends radially therefrom and is bolted to the side sheet 30 thereby retaining the pin 65 in place. Thus the front end of the lower links 60 and 61 are pivotally attached to the rear end of the header, the pivot axes, i.e., the pins 65, of the lower links being coaxial. The rearward ends of the left and right lower links 60 and 61 are pivotally connected as by pivot pins 69 respectively to the lower ends of the vertical frame members 14 and 15, the axes of the pivot pins 69 also being coaxial.

FIG. 3 is a schematic diagram of the suspension linkage illustrating the movement of the header 12 from a lower operating position, shown solid, with the gage shoe on the ground to a transport position 12' with the header nestled beneath the horizontal beam 20 and the gage shoes 40 off the ground. An intermediate position 12'' illustrates the upper portion of the operating range of header floatation, with the gage shoes on the ground, the bottom of the range being somewhat below the ground surface illustrated. The upper swing link 50 and the lower swing links 60,61, one of which is shown in FIG. 3, together with the header 12, i.e., the free link, and the frame assembly 11, i.e., the fixed link, constitute a non-planar four bar non-parallel linkage. In the lower operating positions, the lower swing link 60 is generally horizontal, the upper swing link 50 is generally vertical although slanted rearwardly, and the projections of these links intersect at a point 70, the instant center of rotation of the header 12 relative to the carrying frame 11 which is rearward of the cutterbar 28 but relatively closely adjacent to the harvester 10. When the cutting apparatus 31 is raised a very slight amount, as by the forward portions of the gage shoes 40 encountering a slight obstruction, the header 12 is very slightly angularly displaced about the instant center 70. Since the center of mass 71 of the header is nearer to the instant center than the forward portion of the gage shoes 40 and the cutting apparatus 31, the displacement and thus the acceleration of the center of mass 71 is less than that of the gaging point and the cutting apparatus providing the desirable condition described above, that is, when the header 12 is in the operating range, it acts almost as though it were pivoted to the frame.

It can be seen that because of the changing angular relationship of the swing links 50 and 60, the header 12 rotates clockwise as it moves upwardly and the instant center 70 moves rearwardly to 70'' at the top of the float range. As the header moves to the transport position 12', the swing links 50 and 60 approach a parallel relationship wherein the instant center approaches infinity rearwardly. Thus, in the transport range, the header 12 ceases rotating and moves almost rectilinearly upwardly. Obviously, if the motion were continued, the instant center 70 would shift forward of the harvester 10 and the direction of rotation of the header would reverse, raising the rearward portion thereof faster than the forward portion and providing additional clearance if desired.

Lifting and floatation means are provided for raising and lowering the header 12 relative to the carrying frame and for counterbalancing a large portion of the weight of the header 12 to allow it to follow the ground in a more responsive fashion. To this end, a lifting strap 80 is pivotally connected as by pin 81 to the lower link 60 midway between its ends and at the bottom of the link 60 below a line between the pins 65,69 and below the pivot pin 69, the pin 81 being horizontally rearward of the pin 65 in the operating position. The strap 80 extends upwardly therefrom to a spring anchor 82 attached thereto as by welding and extending laterally outwardly on either side thereof. The lower ends of a pair of floatation tension springs 84 are hooked on the respective spring anchors 82 and extend upwardly inside the frame member 14 to end retaining collars 85 which are threaded on adjusting screws 86 extending through the vertical frame members 14. Thus, by turning the screws 86, a proper amount of tension may be placed on the floatation springs 84. The lifting strap 80 extends beyond the floatation spring anchors 82 to a slotted upper end inside the vertical frame member 14. The slot 87 in the upper end of the lifting strap 80 is engaged by a pin 89 on a lifting lever 90 pivotally connected to the frame member 14 as by transverse pin 91. The lifting lever 90 extends radially outwardly from the pin 91 with a lifting strap 80 to a pivotal connection as by pin 92 with the rod end of a hydraulic cylinder 94 pivotally anchored as at 95 to a gusset within the vertical frame member 14. It will be understood that a similar lift and float mechanism is attached to the right swing link 61 and extends into the right vertical frame member 15. Thus, when the header 12 is in operating position with its ground shoe 40 engaging the ground, the floatation springs 84 acting on the lower swing links 60 and 61 through the short portion of the lifting strap 80 counterbalance the header 12 while the lost motion connections between the slot 87 and the lifting lever 90 prevents the hydraulic cylinders 94 from being pumped during floatation during normal operation. It will be seen that since the connection 81 of the lifting strap is at the bottom of the link 60 and below the pivot 69, the lever arm through which the floatation springs 84 act increases as the header 12 floats upwardly. Thus, although the springs 84 become weaker, the increased lever arm prevents the counterbalancing effect from being reduced accordingly. Extending the hydraulic cylinder 94 takes up the lost motion connection and acting on the lower swing links through the lifting strap 80, raises the header to the transport position, the uppermost position illustrated in FIG. 3.

As thus far described, there is no connection, other than the header 12, between the left and right lower swing links 60 and 61. Thus, it can be seen from the schematic diagram of FIG. 4 (forgetting for the moment the torque transmitting bar 100) that, due to the pivotal connections existing between the lower swing links and the header and carrying frame, lateral floatation is present, that is, the forward end of the link 61 could be raised without raising the forward end of the left link 60. Such is the noraml operating condition of the harvester 10. However, for sidehill and grain operations, a lateral floatation lockout device has been added in the form of a torque transmitting bar 100 which extends along the pivot axis formed by the forward pivot pins 65 between the left and right lower swing links 60 and 61. As viewed in FIG. 5, it will be seen that the torque transmitting bar 100 is hollow and has a radially extending plate 101 welded to the end thereof, the plate having an aperture receiving the end of the pivot pin 65 which maintains the end of the torque transmitting tube 100 in alignment with the pivot axis. The plate 101 is attached to the right lower link 61 as by bolt 102 to form a torsionally rigid connection between the bar 100 and the link 61. The torque transmitting bar 100 extends through, but is not bound by, the ground shoe attaching bracket 41 to the left side of the header 12 whereat it is attached to the left lower swing link 60 in the same manner so that it is rotatable relative to the header 12. It can be seen that any tendency for one of the lower swing links 60, 61 to move angularly with respect to the other lower swing link, as would be the case in a lateral floatation suspension, will produce a moment in the torque transmitting bar 100 is transmitted to the other link to move the other swing link in the same direction as the first. If an absolutely stiff torque transmitting bar is utilized, the result will be a vertical floatation suspension system. The machine may be converted to a full lateral floatation suspension mode merely by removing one of the bolts 102 interconnecting the torque transfer bar plate 101 and the lower links 60 or 61.

Thus, it is apparent that there has been disclosed, in accordance with the invention, a lift and float mechanism that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace such alternatives, modifications and variations as fall within the spirit and scope of the appended claims.

What is claimed is:

1. A mobile crop harvester comprising: a wheel supported main frame including a pair of generally vertical laterally disposed frame members and a horizontal beam extending laterally between said vertical members;

an elongated crop harvesting header mounted to said frame by a pivotal linkage including an upper link and a pair of laterally disposed lower swing links for movements of the header between a lowered operating position and a raised transport position, said header further comprising a cutting apparatus disposed across the forward edge thereof and ground shoes for gaging the height of said cutting apparatus in the operating position; and floatation spring means interconnecting the upper portion of said vertical frame members with the intermediate portion of said lower swing links, the pivotal connection of said floatation spring means to said lower swing links being below a line interconnecting the pivotal mountings of said lower links to said frame and to said header and being below the pivotal mounting of said lower link to said frame in the operating position.

2. The invention in accordance with Claim 1 and said pivotal connection of said floatation spring means to said lower link being disposed substantially horizontally behind the pivotal mounting of said lower link to said header and substantially below the pivotal connection of said lower link to said frame in the operating position of said header.

3. A mobile crop harvester comprising:

a wheel supported main frame including a pair of hollow generally vertical laterally disposed frame members and a horizontal beam extending laterally between said vertical frame members;

an elongated crop harvesting header mounted to said frame by a pivotal linkage including an upper link and a pair of laterally disposed lower swing links for movements of the header between a lowered operating position and a raised transport position, said header further comprising a cutting apparatus disposed across the forward edge thereof and ground shoes for gaging the height of said cutting apparatus in the operating position;

a lifting strap pivotally attached to each of said lower links intermediate the ends thereof and extending to an upper end within said hollow vertical frame members;

a lifting arm pivotally mounted wholly within each vertical frame member and having a lost motion connection with said lifting strap; and a hydraulic cylinder pivotally mounted wholly within said vertical frame member and pivotally attached to said lifting lever arm.

4. The invention in accordance with claim 3 and a pair of floatation springs mounted to said lifting strap in laterally adjacent relationship and extending within said vertical frame member to adjustable connections of said frame member.

5. The invention in accordance with claim 4 and the pivotal connection of said lifting straps to said lower swing links being below a line interconnecting the pivotal mountings of said lower link and below the pivotal mounting thereof to said frame in the operating position.

* * * * *